United States Patent [19]

Klein et al.

[11] 4,447,807

[45] May 8, 1984

[54] SIGNAL TO NOISE RATIO IMPROVEMENT FOR RIP DETECTORS

[75] Inventors: Richard G. Klein, Avon Lake; Robert J. Houck, Akron, both of Ohio

[73] Assignee: The B. F. Goodrich Company, Akron, Ohio

[21] Appl. No.: 275,969

[22] Filed: Jun. 22, 1981

[51] Int. Cl.³ .................................................. G08B 21/00
[52] U.S. Cl. ...................................... 340/676; 198/856; 198/502
[58] Field of Search .................. 340/676; 198/856, 502

[56] References Cited

U.S. PATENT DOCUMENTS

| | | | |
|---|---|---|---|
| 3,636,436 | 1/1972 | Kurauchi et al. | 340/676 X |
| 3,651,506 | 3/1972 | Olaf et al. | 340/676 |
| 3,792,459 | 2/1974 | Snyder | 340/676 |
| 4,229,735 | 10/1980 | Houck | 340/676 |

Primary Examiner—Glen R. Swann, III
Attorney, Agent, or Firm—Maky, Renner, Otto & Boisselle

[57] ABSTRACT

The frequency of the AC signal used to detect the integrity or lack of same in a conveyor belt is reduced to be in the 25 KHz. to about less than 200 KHz. and most preferably in the 50 KHz. to 100 KHz. frequency range. When such AC signals are capacitively coupled to antennas carried by a conveyor belt past a rip detector station, the ratio of the magnitude of such signal relative to that of the cross coupled noise, in particular, and other electrical noise in general is significantly increased. The invention relates to an apparatus and method in which signals in such frequency range are used.

13 Claims, 5 Drawing Figures

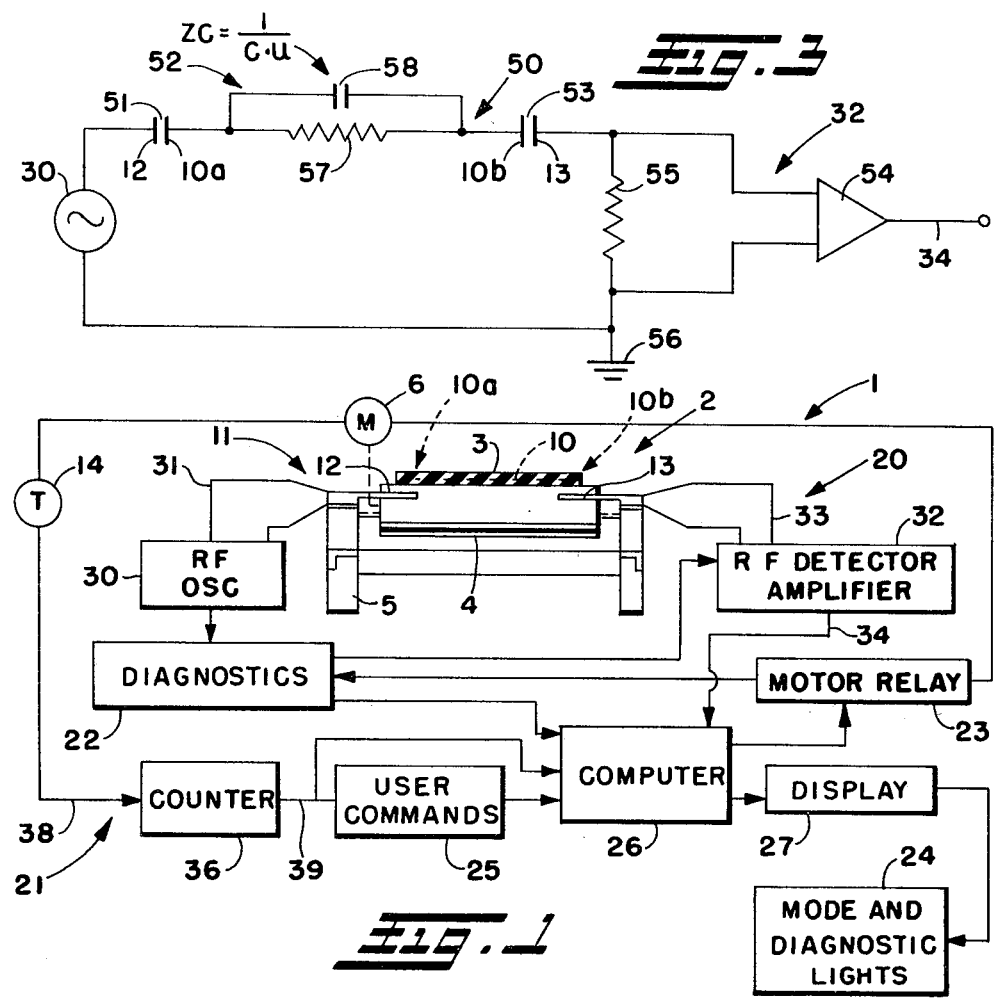
FIG.3
FIG.1
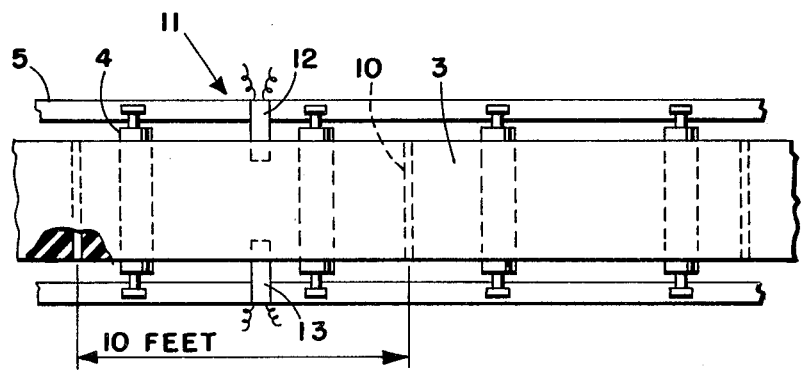
FIG.2

SIGNAL TO NOISE RATIO IMPROVEMENT FOR RIP DETECTORS

TECHNICAL FIELD

The present invention relates to rip detectors and, particularly, to improving the signal to noise ratio of the AC signal used in a rip detector in which as an integral antenna that represents the integrity of the conveyor belt is carried by the conveyor belt past a rip detector station a transmitter capacitively couples an AC signal to the antenna and the AC signal is capacitively coupled by the antenna to a receiver detector.

BACKGROUND

In large endless non-metallic conveyor belts, which may have metal reinforcing cables therein, used to convey bulk material, there is a possibility of encountering a rip in the belt, for example, by a sharp object dropped thereon at the loading station. It is desirable promptly to detect such rips and, preferably, to shut down the conveyor belt upon such detection, thereby minimizing damage to the belt. One such conveyor belt rip detector is disclosed in U.S. Pat. No. 3,792,459. In such rip detector plural antennas, which may be single electrical conductors, are embedded in the belt transversely to its length at spaced-apart locations in the belt. An electrical signal is coupled by respective antennas from a transmitter to a receiver as the belt moves and the respective antennas pass in capacitive coupling relation with the transmitter and receiver at a rip detector station, and the receiver thus delivers an input signal to detector circuitry which interprets the same as an indication of satisfactory belt integrity. However, a broken antenna, for example at a place where the belt has been ripped, will not couple the transmitter signal through to the receiver, and the detector then senses the same as an indication of the occurrence of a rip condition. The detector circuit in such patent is operative after the lapse of a predetermined time period corresponding to the passage of a given number of broken antennas past the rip detector station to produce a distinguishable output that activities an alarm and/or deactivates the conveyor belt drive.

A number of improvements for use in conveyor belt rip detectors are disclosed in U.S. Pat. No. 4,228,513, the disclosure of which is hereby incorporated by reference. One of such improvements includes a means for detecting the progress of the conveyor belt to know when an antenna should be at the rip detector station. If there is no antenna present then, a prompt shutdown of the conveyor belt drive may be effected.

Wear, stretching, contraction, dirt, other environmental conditions, etc. may cause a variation in the efficiency of signal coupling, whether of the capacitive, inductive, optical, or any other type of coupling, between the antennas (or other signal coupling means carried by the belt) and the transmitter and the receiver at a rip detector station. Such efficiency variation will vary the magnitude or other parameter of the input signal delivered from the receiver to the detector, which may detrimentally affect operation of the entire system.

Thus, it would be desirable to provide signal information to the detector at a relatively accurately controlled magnitude (or other parameter). In copending, commonly assigned U.S. patent application Ser. No. 126,218, filed Mar. 3, 1980, the disclosure of which is hereby incorporated by reference, such magnitude control is effected digitally, step-wise and efficiently.

It has been discovered that in some operational environments of conveyor belt rip detectors the electrical noise is so great that the poor signal to noise ratio significantly decreases the accuracy of the rip detector function. Moreover, and very importantly, it has been discovered that in a conveyor belt that carries antennas intended for capacitive coupling with the transmitter and receiver at a rip detector station, much of the electrical noise introduced to the receiver is derived from cross coupling, primarily of a capacitive nature, between the capacitive probes of the transmitter and receiver via the belt itself and/or apparatus associated therewith, such as the rollers, drive wheels, support frame, etc. In connection with such discovery, an equivalent electric circuit model of the transmitter/belt/receiver connection has been developed and used to determine an efficient technique for improving signal to noise ratio even in extremely electrically noisy environments.

SUMMARY OF INVENTION

In accordance with the invention, and in contrast to what ordinarily would be expected, the signal to noise ratio is improved by reducing the frequency of the AC signal ordinarily used in a rip detector system in which the transmitter and receiver are capacitively coupled to antennas sequentially carried past the rip detector station by a conveyor belt. The equivalent circuit model has been found to include between the two input and output probe capacitors a finite resistance of the antenna itself and a cross coupling capacitance operating in parallel with such antenna resistance. A capacitor ordinarily will be more efficient to couple a high frequency signal than a low frequency one. Therefore, it would appear that to get a larger signal into and out from the antenna via the capacitance probes, a higher frequency AC signal should be used. We also have discovered that the impedance of the antennas is large enough in some instances, and especially so when fabric type antennas are used, that the impedance of the cross coupling capacitance, which varies inversely with frequency, will begin to approach that of the antennas, thus causing the impedance to the cross coupled noise to allow the magnitude of such noise signal to approach that of the antenna signal making the latter difficult to distinguish.

However, in accordance with the present invention it has been discovered that the higher the frequency of the AC signal, the greater will be the amount of signal transmitted through the equivalent circuit model cross coupling capacitance whether or not any antenna is present at a rip detector station. Accordingly, by reducing the frequency of the AC signal, the efficiency of transmission via the cross coupling capacitance is reduced. Of course, the frequency of the AC signal must remain large enough to assure adequate signal coupling efficiency at the input and output probes.

In accordance with one aspect of the invention, then, a conveyor belt rip detector apparatus for monitoring the integrity of a conveyor belt having antennas for coupling or not coupling signals as an indication of belt integrity includes a signal generator for generating an AC signal in a frequency range of from about 25 KHz. to less than about 200 KHz. (and preferably in the 50 KHz. to 100 KHz. frequency range), an input signal coupling capacitance for coupling the AC signal to the antennas as they pass the same, a receiver responsive to receipt of AC signals for detecting conveyor belt integrity, and an output signal coupling capacitance for coupling to the receiver AC signals coupled through the antennas as they pass by.

According to another aspect of the invention there is provided an improvement in a conveyor belt rip detector apparatus for monitoring the integrity of a conveyor belt having antennas for coupling or not coupling signals as an indication of belt integrity, that apparatus including a signal generator for generating an AC signal, an input capacitance for coupling the AC signal to the antennas as they pass thereby, a receiver responsive to receipt of AC signals for detecting conveyor belt integrity, and an output capacitance for coupling to the receiver AC signals coupled through the antennas as they pass by, with the improvement particularly residing in the use of a signal generator producing the AC signal at a frequency at which a relatively signficant proportion thereof will couple via the antennas and at which frequency cross coupling noise coupled to the detector will be minimized.

According to an additional aspect of the invention, a method for detecting the integrity of a conveyor belt having antennas for coupling or not coupling signals as an indication of the belt integrity includes capacitively coupling to respective antennas an AC signal in a frequency range of from about 25 KHz to about less than 200 KHz (and preferably in the 50 KHz to 100 KHz range), capacitively coupling to a receiver AC signals coupled through such antennas, and sensing whether such AC signals are received by such receiver as an indication of conveyor belt integrity.

An additional aspect of the invention relates to a method for detecting the integrity of a conveyor belt having antennas in which an input AC signal is capacitively coupled to selected antennas, and an AC signal conducted in selected antennas is or is not capacitively output coupled to a detector as an indication of the integrity of the conveyor belt, the improvement comprising using as such input AC signal one that has a frequency at which a relatively significant proportion thereof will couple via such antenna and at which frequency cross coupling noise coupled to the detector will be minimized.

With the foregoing in mind, a primary object of the invention is to improve conveyor belt rip detector apparatus and method, as noted herein.

Another object is to improve the signal to noise ratio in conveyor belt rip detectors.

Another object is to improve the accuracy of conveyor belt rip detectors.

A further object is to minimize the filtering required to separate electrical signals from electrical noise, particularly in connection with conveyor belt rip detector devices.

Still another object is to enhance overall operation of conveyor belt rip detectors.

These and other objects and advantages of the present invention will become more apparent from the following description.

To the accomplishment of the foregoing and related ends, the invention, then, comprises the features hereinafter fully described in the specification and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a schematic system diagram of a conveyor belt system with which the conveyor belt rip detector monitor system of the present invention may be used;

FIG. 2 is a fragmentary top plan view schematically showing the conveyor belt, antennas therein, and a rip detector station;

FIG. 3 is an equivalent circuit model of the transmitter/belt/receiver connection in the conveyor belt rip detector monitor system of the invention;

DETAILED DESCRIPTION OF INVENTION

Figure 4:
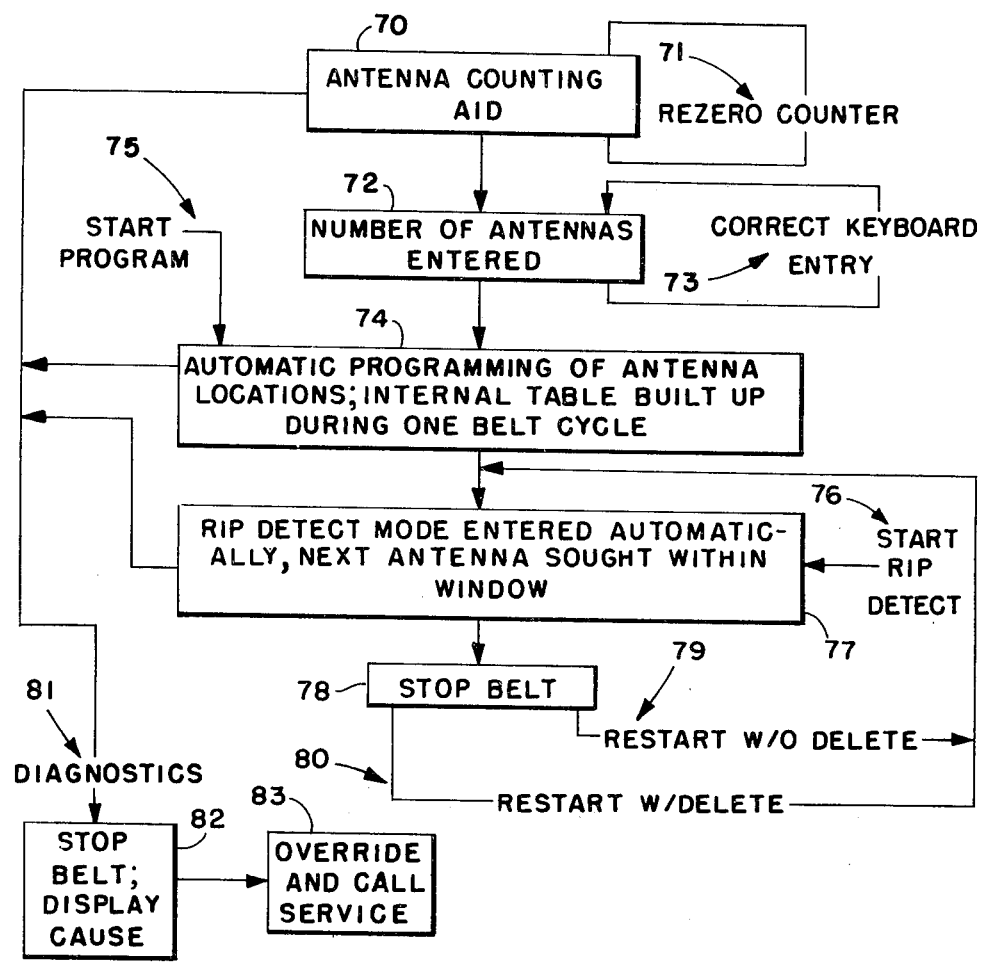
FIG. 4 illustrates a representative flow chart of procedures and steps followed in operation of the overall monitor system.

Referring now in detail to the drawings, and initially to FIGS. 1 and 2, a monitor system generally indicated at 1 is shown in association with a conveyor belt system 2 for detecting a rip, tear, or other similar flaw (hereinafter collectively "rip") in the conveyor belt 3. The belt 3, which may be a conventional endless, non-metallic conveyor belt, is supported by rollers 4 at longitudinal stations along a support frame 5 and is driven by a motor 6 which turns a drive roller.

The transducer technique for observing the structural integrity, or lack of the same, e.g. a rip, of the belt 3 uses a plurality of antennas 10 embedded in or otherwise carried by the belt generally transversely to the travel direction thereof and at a rip detector station 11 a transmitter plate 12 and a receiver or detector plate 13. Each antenna 10 preferably is a single electrical conductor of relatively small gauge, or other type of electrical conductor, intended, when passing the station 11, capacitively to couple with the transmitter and receiver plates 12, 13 to couple an electrical signal therebetween. Such signal coupling indicates the structural integrity of the antenna and proximate portions of the belt 3; the lack of such signal coupling where it is expected to occur generally indicates a flaw, such as a break in the antenna and a rip in the proximate portion of the belt 3.

As the belt 3 progresses in its process of traveling along its length, the monitor system 1 continuously looks for the sequential cyclical occurrence of events, namely the passing of the respective antennas by the rip detector station 11. The monitor system 1 also particularly observes the progress of such process, for example by monitoring the rotation or output of the motor 6 or rotation of the drive roller with a conventional tachometer 14, and correlates such progress information with the detected event information to sense promptly when an event has been missed. Upon missing an event, the monitor system 1 may promptly stop the motor 6 to shut down the conveyor belt system 2 minimizing any rip damage to the belt 3.

The fundamental components of the monitor system 1 include an event detector 20, a progress detector 21, a diagnostics portion 22, a shut-down control portion 23, an output indicator portion 24, a user command portion 25, a comparator portion 26, such as a computer, and preferably a microcomputer, that stores and compares information received from the various portions of the monitor system and effects appropriate control in response to such information, and a display portion 27.

The event detector 20 is coupled to an event transducer including the transmitter and receiver plates 12, 13 at the rip detector station 11 in proximity to the belt 3 for capacitive coupling to and through an antenna 10. The detector 20 includes an oscillator 30, which produces an AC electrical signal, preferably in the radio frequency range, for example, on the order of about 25 KHz. to less than about 200 KHz., delivered by an electrical connection 31 to the transmitter plate 12; and a detector amplifier 32 coupled to the receiver plate 13. When an antenna 10 passes in proximity to the transmitter plate 12 such AC signal is capacitively coupled to the antenna. Moreover, assuming such antenna is whole, i.e. in particular there is no rip in the belt 3 at that location, such signal will be capacitively coupled from the antenna to the receiver plate 13 for delivery via an electrical connection 33 as an event signal to the detector-amplifier 32. The detector-amplifier 32 preferably is primarily responsive only to an event signal that has a frequency at least approximately equal to the AC signal produced by the oscillator 30; accordingly, the detector-amplifier 32 preferably is a radio frequency responsive device. Receipt of a proper event signal is communicated as an event detect signal by a connection 34 to the computer in the comparator portion 26. Thus, the event signal is an input signal to the detector amplifier 32 and the event detect signal is an output signal therefrom.

The signal control apparatus of the above mentioned application Ser. No. 126,218 is an improvement in such detector amplifier with a control provided therefor by the computer 26.

Progress of the belt movement is detected by the progress detector 21, which may include a progress transducer in the form of a tachometer 14 and a counter 36. The tachometer 14 is connected to the conveyor belt drive motor 6 or drive roller 7 and produces in conventional manner a series or train of electrical pulses on line 38. The frequency of such pulse train preferably is directly proportional to the rotational speed of the motor 6 and, accordingly, directly proportionately represents the progress of the belt 3 as it is driven along its path. The counter 36 converts the serial pulse train information from the tachometer 14 to parallel binary data, such as a 16 bit binary number, the progress signal, which also directly represents progress of the belt 3 and is delivered on a bus 39 to the computer in comparator portion 26.

Briefly, in operation of the monitor system 1 observing the belt 3 to sense whether a rip has occurred, information concerning the relative interval distances between each pair of adjacent antennas is obtained and stored during one cycle of the belt 3. Using such information, the monitor system sequentially looks for each antenna at its expected position, within a tolerable window of error or offset. The relevant interval distance information is updated each time an antenna is detected. However, when an antenna is missed, i.e. it is not sensed at its expected position, the monitor system 1 stops the belt 3.

More particularly, the computer 26, when it receives an event detect signal on line 34, reads and stores the progress signal on bus 39. When the next event detect signal is received, the computer 26 again reads and stores the progress signal on the bus 39. The value of the difference between the two progress signals, then, represents the distance between the two adjacent antennas 10 that passed the rip detector station 11 to produce the two event detect signals. This procedure is repeated to obtain information concerning the distances between each pair of adjacent antennas. Such information is measured or detected and is stored, for example in a table, during a programming mode of operation of the monitor system 1. After the table has been completed with information concerning the distances between every pair of adjacent antennas, the monitor system 1 can operate in a rip detect mode. More particularly, in the rip detect mode the computer 26 compares the progress signal on bus 39 with the relevant value of information from the stored table to determine when an antenna 10 should be present at the rip detector station 11. If there is a whole antenna properly positioned at the rip detector station 11 in capacitive coupling relation with the transmitter and receiver plates 12, 13 at that time, meaning that the conveyor belt 3 also is whole, then the monitor system begins looking for the next antenna. However, if, when expected, there is no antenna present at the rip detector station 11 or the antenna then present is broken, indicating a conveyor belt system 2 fault or a belt rip, respectively, no event detect signal will be delivered to the computer 26; accordingly, the computer 26 promptly declares the event missing and operates the start stop control portion 23 to stop the belt 3 in order to minimize any damage thereto.

Preferably the start stop control portion 23 is a relay that controls energization and de-energization of the motor 6 and/or a conventional clutch and braking system for the conveyor belt system 2. Operation of the relay 23 by the computer 26, then, determines whether or not the conveyor belt 3 will move. In the output indicator portion 24 plural mode lights and diagnostic lights, which are operated by the computer 26, indicate the operational mode of the monitor system 1 and the reason for any detected failure or shut-down of the conveyor belt system 2. The user command portion 25 may include a plurality of manually operated pushbutton controls or connections to receive electrical input control information from external equipment, such as a remote control panel, electronic control equipment, etc., to effect operational control of the monitor system.

Referring in detail to FIG. 3, an equivalent circuit model of the transmitter/belt/receiver connection is generally represented at 50. The equivalent circuit 50 includes the oscillator or transmitter 30, and input probe capacitance 51, which is made up by plate 12 and an end portion 10a of the antenna 10 (FIG. 1), the belt impedances 52, output probe capacitance 53, which includes the plate 13 (FIG. 1) and an end portion 10b of the antenna 10 at the opposite end thereof from the end portion 10a, and the detector amplifier 32 represented by an amplifier 54 and its input resistance 55. A ground reference potential 56 is connected to the transmitter 30 and detector amplifier 32.

The equivalent circuit 50 is the circuit appearing at a rip detector station when an integral antenna is capacitively coupled with the transmitter and receiver plates 12, 13. With such alignment of the antenna or coupling thereof with respect to the plates 12, 13, the belt impedances 52 have been discovered to include a finite resistance 57 of the antenna 10 itself and a capacitance 58 effectively in parallel with the resistance 57. Ordinarily, the magnitude of the resistance 57 will be relatively small inasmuch as the antenna is a relatively good conductor, especially with respect to the general conductivity of the belt. On the other hand, the magnitude of the capacitance 58 will be a function of the material of which the belt is constructed, the orientation of the belt with respect to its frame, the construction of the conveyor belt, support frame, etc.

Moreover, the magnitude of the input and output probe capacitances 51, 53 also may vary as an antenna approaches and leaves the respective plates 12, 13, and there may also be capacitive coupling between the plates 12, 13 and the belt when no antenna is present at a rip detector station, whereupon the magnitude of the resistance 57 becomes quite large in the equivalent circuit 50, while the magnitude of the capacitance 58 may remain substantially constant.

An essential feature of operation of the monitor system 1 and particularly the equivalent circuit 50 is to obtain a relative maximum output signal on the output line connection 34 from the detector amplifier 32 when a whole antenna is aligned and relatively effectively capacitively coupled with the input and output probe capacitances 51, 53 at a rip detector station 11 and to minimize the magnitude of the output signal at connection line 34 when no antenna is at a rip detector station 11. It is important, too, to minimize the amount of electrical noise coupled through the belt impedances 52 while assuring effective coupling of the AC signal from the transmitter 30 on line 31 to the detector amplifier 32 when an antenna is aligned at a rip detector station, accordingly to enhance and preferably to maximize the signal to noise ratio.

The applicants have discovered the existence of the equivalent circuit model 50 and also have discovered that the magnitude of the capacitance 58 remains relatively constant for a given belt, support frame, and other associated equipment with some proximity to the rip detector station 11. The capacitance 58 is due to what applicants refer to as cross coupling effected, apparently, in a capacitive way via the belt and the associated equipment at a rip detector station substantially independently of the antennas 10 passing at a rip detector station. The complete cross coupling phenomenon, however, is not fully understood, although the fact that it does exist is quite clear.

A conventional solution to improving signal to noise ratio in the monitor system 1 would be, for example, to increase the frequency of the AC signal produced by the transmitter 30 thereby to enhance the efficiency of capacitive coupling of such signal between the respective transmitter and receiver plates 12, 13 and the respective antennas 10 at their ends 10a, 10b when they pass a rip detector station 11. By increasing the frequency of the AC signal produced by the transmitter 30, however, the magnitude of the electrical noise transmitted when an antenna is aligned at a detector station 11, as well as when it is not there, also will be increased, because some of that higher frequency AC signal will pass through the effective cross coupling capacitance 58. Therefore, overall signal to noise ratio will not significantly be improved, if improved at all, by such frequency increase.

In contrast, however, to what ordinarily would be expected, the present invention relies on a reduction of the frequency of the AC signal produced by the transmitter 30 to a level preferably below, and most preferably well below, the 200 KHz. level proposed, for example, in application Ser. No. 126,218. The reduced frequency signal still will be coupled effectively via the input and output probe capacitances 51, 53, but will tend not to be coupled so efficiently as a higher frequency signal by the cross coupling capacitance 58. Additionally, the frequency selected for the AC signal produced by the transmitter 30 preferably is selected in consideration of the capacitance coupling efficiency of the input and output probe capacitances 51, 53 as well as the magnitude of the cross coupling capacitance 58 so that the magnitude of cross coupled noise will decrease proportionately more than the magnitude of the AC signal coupled through the probe capacitances as the frequency is reduced.

Mathematically, the impedance of the circuit including the capacitors 51, 53 and 58 is inversely proportional to frequency. Therefore, looking exclusively at the absolute magnitude of the impedence ZC of the capacitance 58 having a magnitude C, such impedance is equal to the inverse of the product of the capacitance C and the frequency u. Accordingly, as the frequency increases, while the capacitance C of the cross coupling capacitor 58 remains constant, the magnitude of the impedance ZC will decrease.

In the preferred embodiment and the best mode of the present invention, the antennas 10 may be made of a fabric or fabric-like material, which have approximately 10 Kohm. impedance. Therefore, it will be appreciated that for relatively high frequency signals, say on the order of 200 KHz. or greater, the impedance of the cross coupling capacitance 58 will begin approaching that of the fabric antennas 10 so that it will become extremely difficult to distinguish between signals coupled by the antennas and signals caused by cross coupling capacitive effect. On the other hand, in accordance with the present invention, by reducing the frequency of the AC signal produced by the transmitter 30 to one below 200 KHz. and preferably on the order of 50 KHz. to 100 KHz., the impedance of the cross coupling capacitance 58 will be appreciably greater than that of the fabric antennas 10 so that signal to noise ratio will be improved.

The several operating modes for the monitor system 1 are depicted in a functional block diagram in FIG. 4. The monitor system 1 may be used as a counting aid for antennas or other events detected by the monitor system, block 70. This function is particularly useful when the antennas are embedded in a conveyor belt and are not ordinarily visually discernible. In such counting aid mode of operation, a user puts a reference mark on the belt 3, enters by user command portion 25 a rezero command for an internal counter in the computer 26 to cause the display 27 to show a zero count value, as represented at 71, and enters an input command to the monitor system 1 to start the conveyor belt system 2, e.g. by closing relay 23. As each whole antenna passes and is counted at the rip detector station 11, the event detect signal on line 34 causes the computer 26 to increment the value shown on the display 27. When the reference mark returns to the rip detector station, the value shown on the display 27 will indicate the number of whole antennas in the belt 3 detectible by the event detector 20. With the number of antennas or other events known, the user may enter that information to the computer 26, box 72, for example by a conventional keyboard, as represented at 73, of the user command portion 25. The user would then enter a command to the computer 26 via the keyboard or other switch, for example, to cause the monitor system to commence operation in the programming mode to build the table of information on the distances between adjacent pairs of antennas. The use of the monitor system 1 as an event counting aid and the just described keyboard entry of events to the monitor system are, however, alternate embodiments to the best mode of the present invention.

In box 74 the automatic programming mode of the antenna locations and the building of the internal table during one belt cycle is presented. According to the best mode of the invention, a user may put a reference mark on the conveyor belt 3 at the rip detect station 11 and enter a start programming command, represented at 75, to start the conveyor belt system to build up the table of relative distance information. When the reference mark returns to the rip detector station 11, the user may enter a start rip detect command signal, represented at 76, for example by a further switch that delivers an appropriate signal to the computer 26, to cause the monitor system 1 automatically to observe the condition of the belt 3 to sense a rip therein. Such rip detect mode of operation is represented at box 77.

As an alternate embodiment to the best mode of the present invention, the computer 26 may be programmed to cause the monitor system 1 automatically to enter the rip detect mode. In this alternate embodiment, the number of antennas would have to be entered, box 72, as aforesaid. The monitor system, then, would automatically build the table of information for that number of antennas; upon completion of the table, the monitor system 1 automatically would enter the rip detect mode, box 77.

During operation of the monitor system 1 in the rip detect mode, according to the information contained in the table, the monitor system 1 will look for each successive antenna at its anticipated position relative to the progress of the belt 3. In order to take into consideration the possibility of slippage, stretching, and the like of the conveyor belt during its operation and life expectancy, as well as other similar inaccuracies in the actual position of the respective antennas, a window of error is permitted preferably on both sides of the anticipated position of each antenna. Therefore, the monitor system 1 will look for an antenna slightly before its expected arrival at the rip detector station 11 and for a brief period after the expected arrival; if no antenna is detected within the permitted window, the monitor system 1 promptly stops the conveyor belt system 2, as shown at box 78. However, when the monitor system 1 does detect an antenna within an expected window, the actual position of that antenna, as detected by the progress detector 21, relative to the position of the preceding antenna, is input at the appropriate location in the table to update the same, thereby allowing the tabular information to vary gradually within prescribed limits.

Whenever the monitor system 1 shuts down the conveyor belt system 2 due to a missed antenna, the user may restart the conveyor belt system, usually after having visually inspected the belt. As is shown at 79, such restart may be without deleting the information concerning the missed antenna from the table to check, for example, whether the shut-down was due only to an inadvertently broken antenna. If the missed antenna were broken, even though the belt is otherwise intact, the monitor system 1 would shut down the conveyor belt system 2 at the completion of the next cycle. Usually the control for this type of restart operation would be accessible to a user in the field. However, if the monitor system 1 and conveyor belt system 2 were to be restarted with deletion from the table of the information concerning the broken antenna, say, as indicated at 80, then the system would continue operating in rip detect mode without looking for the suspect antenna during the subsequent cycles of operation of the conveyor belt. This latter type of restart operation ordinarily would be accessible only to a qualified serviceman, who would be expected to check the belt 3 and system 1 thoroughly before deleting the information concerning the suspect antenna from the table.

As is shown at 81 in FIG. 2, the diagnostics portion of the monitor system 1 continuously checks various portions of the system to assure proper operation thereof. In the event of a failure being detected by the diagnostics portion, the monitor system 1 will promptly stop the belt and will energize the mode and diagnostic lights indicators portion 24 appropriately to display the reason for shut-down, box 82. Moreover, the monitor system may be overridden manually by the user, box 83, to coninue operation of the conveyor belt system 2 without rip detection by the monitor system 1. Ordinarily, such overriding would occur when it is believed that a failure has occurred in the monitor system 1 while the conveyor belt 3 remains intact.

Figure 5:
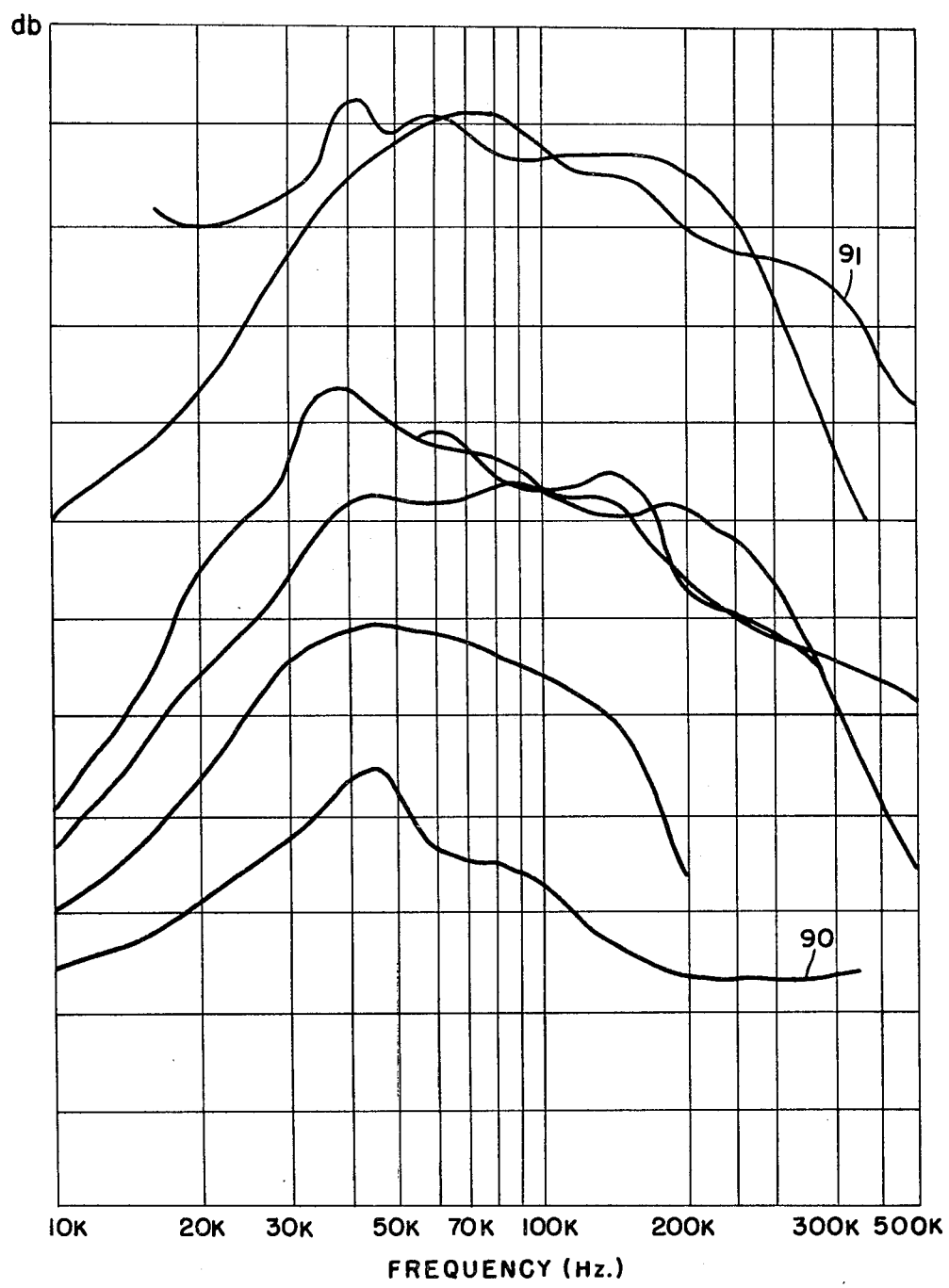
FIG. 5 is a graphical representation of signal strength in decibels versus frequency for rip detector monitor systems in accordance with the present invention used with various conveyor belt systems.

Briefly, turning to FIG. 5, a graphical representation of the frequency response for several conveyor belts tested is illustrated. In particular, the abscissa in FIG. 5 represents frequency in Hertz on a logarithmic scale, and the ordinate represents the actual signal to noise ratio of the signal received at the detector amplifier 32 or produced on output line 34 on a decibel scale. The frequency referred to is the frequency of the AC signal produced by the transmitter 30. Looking, for example, at curve 90, which represents the frequency response of a non-metallic conveyor belt having steel cable reinforcement, the peak response, i.e. the maximum signal to noise ratio occurs at approximately 48 KHz., and there clearly is a flattening of the response curve at frequencies greater than 200 KHz. The curve 91 represents the frequency response of a fabric conveyor belt that does not have steel cable reinforcement, but does use fabric antennas and it will be seen that for such conveyor belt there is a peak signal to noise ratio frequency response at approximately 75 KHz. It also will be evident from the curves illustrated in FIG. 5 representing the frequency responses of other conveyor belts, that the peak signal to noise ratio as a function of frequency of the AC signal produced by the transmitter 30 will reach a peak at frequencies between about 25 KHz. and 200 KHz. Moreover, all of the maximum peaks will occur between 35 KHz. and 100 KHz. As a rule of thumb, though, to obtain optimum signal to noise ratio and equipment response, the frequency of the AC signal should be on the order of between 50 KHz. and 100 KHz.

STATEMENT OF INDUSTRIAL APPLICATION

In view of the foregoing, it will be appreciated that the subject invention may be employed for signal control purposes, for process monitoring purposes, and particularly for improved conveyor belt rip detector purposes.

We claim:

1. Conveyor belt rip detector apparatus for monitoring the integrity of a conveyor belt having antenna means for coupling or not coupling signals as an indication of a belt integrity, said antenna means having finite resistance and said conveyor belt and associated apparatus having a finite cross coupling capacitance, comprising: signal generator means for generating an AC signal in a frequency range of from about 25 KHz. to less than about 100 KHz., the frequency of such AC signal being such that the effective impedance of such cross coupling capacitance as a function of such frequency is at least several times greater than that of such antenna means, input capacitance signal coupling means for coupling such AC signal to such antenna means, receiver means responsive to receipt of AC signals for detecting conveyor belt integrity, and output capacitance means for coupling to said receiver means AC signals coupled through such antenna means.

2. In a conveyor belt rip detector apparatus for monitoring the integrity of a conveyor belt having antenna means for coupling or not coupling signals as an indication of belt integrity, including input capacitance signal coupling means for coupling an input AC signal to such antenna means, receiver means responsive to receipt of AC signals for detecting conveyor belt integrity, and output capacitance means for coupling to said receiver means AC signals coupled through such antenna means, said antenna means having finite resistance and said conveyor belt and associated apparatus having a finite cross coupling capacitance, the improvement comprising: signal generator means for generating as such input AC signal an AC signal having a frequency at which a relatively significant proportion thereof will couple via such antenna means and at which frequency cross coupling noise coupled to such detector will be substantially minimized, the frequency of said input AC signal being such that the effective impedance of such cross coupling capacitance as a function of such frequency is at least several times greater than that of such antenna means.

3. The apparatus of claim 1 or 2, wherein said antenna means have an impedance on the order of about 25 Kohms.

4. The apparatus of claim 2, wherein said signal generator means generates such AC signal in a frequency range of from about 25 KHz. to about 100 KHz.

5. The apparatus of claims 1 or 2, further comprising control means for stopping the conveyor belt when a predetermined number of antenna means has not been detected by said receiver means.

6. The apparatus of claims 1 or 2, wherein said antenna means comprise fabric antennas, and said conveyor belt comprises a generally electrically non-conductive material containing or not containing conductive reinforcing therein.

7. A method for detecting the integrity of a conveyor belt having antenna means for coupling or not coupling signals as an indication of such integrity, wherein said antenna means have a finite resistance and said conveyor belt and associated apparatus have a finite cross coupling capacitance, comprising: capacitively coupling to respective antennas an AC signal in a frequency range of from about 25 KHz. to about less than 100 KHz., capacitively coupling to a receiver AC signals coupled through such antenna means, and sensing whether such AC signals are received by such receiver as an indication of conveyor belt integrity and further comprising providing such AC signal at a frequency such that the effective impedance of such cross coupling capacitance as a function of such frequency is at least several times greater than that of said antenna means.

8. In a method for detecting the integrity of a conveyor belt having an antenna means in which an input AC signal is capactively input coupled to selected antenna means, and an AC signal conducted in selected antenna means is or is not capacitively coupled to a detector as an indication of the integrity of such conveyor belt, wherein said antenna means have a finite resistance and said conveyor belt and associated apparatus have a finite cross coupling capacitance, improvement comprising: using as such input AC signal, a signal having a frequency at which a relatively significant proportion thereof will couple via such selected antenna means and at such frequency cross coupling noise coupled to such detector will be substantially minimized, and provided such input AC signal at a frequency such that the effective impedance of such cross coupling capacitance as a function of such frequency is at least several times greater than that of said antenna means.

9. The method of claim 8, wherein such AC signal is in a frequency range of from about 25 KHz. to about 100 KHz.

10. The method of claims 7 or 8, further comprising stopping the conveyor belt when a predetermined number of antenna means has not been detected by said receiver means.

11. The method of claims 7 or 8, wherein said antenna means comprise fabric antennas, and said conveyor belt comprises a generally electrically non-conductive material containing or not containing conductive reinforcing therein.

12. In a conveyor belt rip detector apparatus for monitoring the integrity of a conveyor belt having antenna means for coupling or not coupling signals as an indication of belt integrity, including input capacitance signal coupling means for coupling an input AC signal to such antenna means, receiver means responsive to receipt of AC signals for detecting conveyor belt integrity, and output capacitance means for coupling to said receiver means AC signals coupled through such antenna means, said antenna means having finite resistance and said conveyor belt and associated apparatus having a finite cross coupling capacitance, the improvement comprising: signal generator means for generating as such input AC signal an AC signal having a frequency at which a relatively significant proportion thereof will couple via such antenna means and at which frequency cross coupling noise coupled to such detector will be substantially minimized, and wherein said antenna means comprise fabric antennas, and said conveyor belt comprises a generally electrically non-conductive material containing or not containing conductive reinforcing therein.

13. In a method for detecting the integrity of a conveyor belt having antenna means in which an input AC signal is capacitively input coupled to selected antenna means, and an AC signal conducted in selected antenna means is or is not capacitively coupled to a detector as an indication of the integrity of such conveyor belt, wherein said antenna means have a finite resistance and said conveyor belt and associated apparatus have a finite cross coupling capacitance, improvement comprising: using as such input AC signal, a signal having a frequency at which a relatively significant proportion thereof will couple via such selected antenna means and at such frequency cross coupling noise coupled to such detector will be substantially minimized, and wherein said antenna means comprise fabric antennas, and said conveyor belt comprises a generally electrically non-conductive material containing or not containing conductive reinforcing therein.

* * * * *